S. Vanstone.
Making Metal Tubes.
N° 90,322.   Patented May 18, 1869.
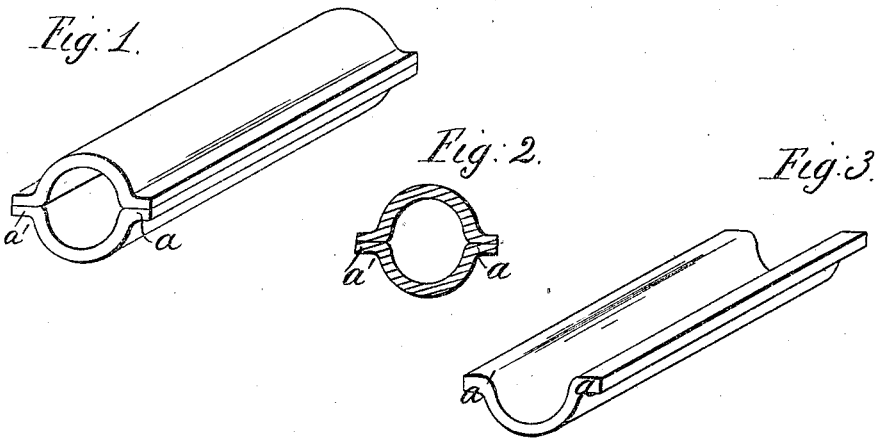
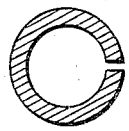
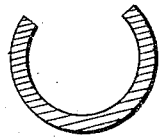
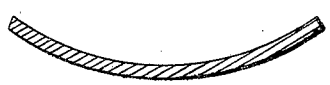
Witnesses;
W. B. Vincent
John D. W. Taylor
Inventor,
Samuel Vanstone

United States Patent Office.

SAMUEL VANSTONE, OF PROVIDENCE, RHODE ISLAND, ASSIGNOR TO HIMSELF AND JOHN W. HOARD, OF SAME PLACE

Letters Patent No. 90,322, dated May 18, 1869.

IMPROVEMENT IN THE ART OF MAKING METAL TUBES.

The Schedule referred to in these Letters Patent and making part of the same.

*To all whom it may concern:*

Be it known that I, SAMUEL VANSTONE, of the city and county of Providence, in the State of Rhode Island, have invented a new and improved "Mode of Forming Tubes;" and I do hereby declare that the following specification, taken in connection with the drawings, making a part of the same, is a full, clear, and exact description thereof.

Figure 1 represents my improved tube.
Figure 2 is a transverse section of the same.
Figure 3 is a horizontal section.

My invention embraces the forming of tubes of all kinds, as hereinafter described, having, however, especial reference to that class known as steam and gas-pipe, and has for its object the production of an article which, in point of durability and strength, shall be superior to others now in use, and, at the same time, capable of being manufactured with much greater rapidity.

The steam and gas-pipe now in common use is manufactured from flat strips of iron, rolled for that purpose, by crimping the same by means of suitable machinery, until the edges come nearly in contact with each other, and the whole attains almost a circular form. This being accomplished, the pipe is thrust into the furnace, and brought to a welding-heat, and while so heated is drawn through three or more dies, each succeeding die being smaller than the former, which brings together and firmly unites the edges, and at the same time reduces the pipe to a circular-shape, in the manner already well understood.

This method of forming the tubes is open to several objections, among which are the crimping of the iron, the insufficiency of the weld in point of strength, and the time consumed in the manufacture of the same.

These objections I overcome in my invention, which I will now proceed to describe.

I first make my tube in two sections, each of which is rolled into a half, or nearly half-circular form, as shown in fig. 3, and provided with two flanges, $a\ a'$, for the purpose of welding, hereinafter described.

The sections may, however, be brought into the desired shape by the crimping process, as in the old method, before referred to, which I discard, both on account of the length of time it requires, and its tendency to weaken the iron.

I next place the two sections together, as shown in figs. 1 and 2, and heat the pipe thus formed until it reaches a welding-heat, when it is taken out, and passed endwise between two rollers, provided with an annular groove, so that the pressure is mostly received upon the flanges, and welds them firmly together.

Whenever it is desired to remove the rim thus left upon the tube, though materially lessening its strength, it may easily be done while it is passing through the rolls, as before described, by the arrangement of suitable cutters in connection with the same.

What I claim as my invention, and desire to secure by Letters Patent, is—

The method, herein described, of forming tubes or pipes, by rolling each half of the blank with corresponding flanges, and welding the said flanges together, in the manner specified.

SAMUEL VANSTONE.

Witnesses:
W. B. VINCENT,
JOHN D. W. TAYLOR.